United States Patent [19]

Eguchi et al.

[11] 4,392,375
[45] Jul. 12, 1983

[54] ROTATIONAL ANGLE DETECTING APPARATUS

[75] Inventors: Osamu Eguchi, Anjo; Mitsutoshi Hattori, Okazaki; Takatsugu Hanaoka, Kariya, all of Japan

[73] Assignee: Nippondenso Co., Ltd., Kariya, Japan

[21] Appl. No.: 228,551

[22] Filed: Jan. 26, 1981

[30] Foreign Application Priority Data

Jan. 30, 1980 [JP] Japan .................................. 55-9779

[51] Int. Cl.³ ..................... G01M 19/00; G08C 19/04
[52] U.S. Cl. ..................................... 73/118; 324/208; 340/870.38
[58] Field of Search ................ 73/118; 340/870.38; 116/DIG. 21, 204; 324/208, 252

[56] References Cited

U.S. PATENT DOCUMENTS

| | | | |
|---|---|---|---|
| 1,160,418 | 11/1915 | Kocourek | 116/204 X |
| 3,486,479 | 12/1969 | Hartmann | 116/204 |
| 3,519,899 | 7/1970 | Yamada | 324/252 X |
| 3,952,587 | 4/1976 | Goodhart | 73/118 X |
| 4,016,827 | 4/1977 | Lawrence, Jr. | 116/204 |
| 4,056,722 | 11/1977 | Ray | 116/DIG. 21 |
| 4,164,706 | 8/1979 | Akita et al. | 340/870.38 X |
| 4,197,748 | 4/1980 | Stenehjem | 116/204 X |
| 4,359,685 | 11/1982 | Eguchi et al. | 324/208 |

OTHER PUBLICATIONS

Publ. "Moving Articles Through Ascending Magnetic Field" by Bankes et al., Western Electric, pp. 1-2, Brochure Digest #57, 1/1980.
Publ. "Position Detecting . . . Method", (Kokai No. 53-80249 7/15/78), Fujikura et al.

*Primary Examiner*—Daniel M. Yasich
*Attorney, Agent, or Firm*—Cushman, Darby & Cushman

[57] ABSTRACT

A rotational angle detecting apparatus includes a rotating member secured to one end of the rotating shaft of an object to be detected for rotation along with the rotating shaft which is rotatable in response to a change in a physical quantity. The apparatus further includes a non-rotating member fixedly positioned opposite to the rotating member, a magnetic field generating source disposed on one of the rotating member and the non-rotating member to generate a magnetic field, and a magnetic sensing element disposed on the other of the rotating member and the non-rotating member to generate an output signal which varies in dependence on the direction of the magnetic field.

2 Claims, 4 Drawing Figures

ROTATIONAL ANGLE DETECTING APPARATUS

BACKGROUND OF THE INVENTION

The present invention relates to a rotational angle detecting apparatus which converts a mechanical angular displacement into an electrical quantity in a non-contacting manner by means of a magnetic sensing element whose resistance value varies in dependence on the direction of a magnetic field.

Recently, the various control systems used in automotive vehicles include a rotational angle detector for measuring for example the position of an intake air flow measuring valve or throttle valve, and the rotational angle detector is for example of the type in which a movable contact member mechanically slides over a resistor to vary the resistance ratio or of the switch type in which a switch is turned on and off at definite angles.

These known rotational angle detectors (hereinafter referred to as angle sensors) have been manufactured in constructions in which a sensor section includes a movable rotor, bearings, etc. As a result, the manner of mounting the angle sensor to an object to be measured has become very important (if the mounting of the sensor were such that would cause shifting of the shaft, for example, the bearings would be damaged in a short period of time) and thus the manufactures have been exerting their ingenuities in finding improved manners of mounting the angle sensors.

An example of the known mounting methods designed to prevent any slight shifting of the shaft from causing damage to the bearings in the sensor section is such that since the arrangement as such is subject to hysteresis, the sensor section is specially provided with a spring so that a force is always applied in a predetermined direction to the rotor in the sensor section so as to prevent the hysteresis.

SUMMARY OF THE INVENTION

In view of these circumstances in the prior art, it is the object of the present invention to provide an improved rotational angle detecting apparatus in which by virtue of the use of a magnetic sensing element whose resistance value is varied in dependence on the direction of a magnetic field, a sensor section forms a non-contacting sensor including no moving parts and bearings, thus greatly simplifying the mounting of the apparatus to an object to be measured and also ensuring greater reliability against aging, vibrations, etc., due to the non-contacting sensor comprising the magnetic sensing element.

In accordance with the present invention there is thus provided a rotational angle detecting apparatus in which a sensor for sensing the rotational angle of an air flow meter measuring valve, a throttle valve or the like includes a magnetic sensing element whose resistance valve is varied in dependence on the direction of a magnetic field thus making the sensor into a non-contacting type, greatly simplifying the mounting of the apparatus to an object to be measured due to the structure of the sensor including no moving parts and bearings, and ensuring greater reliability against aging, vibrations, etc., and simplified maintenance due to the non-contacting sensor employing the magnetic sensing element.

DESCRIPTION OF THE PREFERRED EMBODIMENT

The present invention will now be described in greater detail with reference to the illustrated embodiment.

Figure 1:
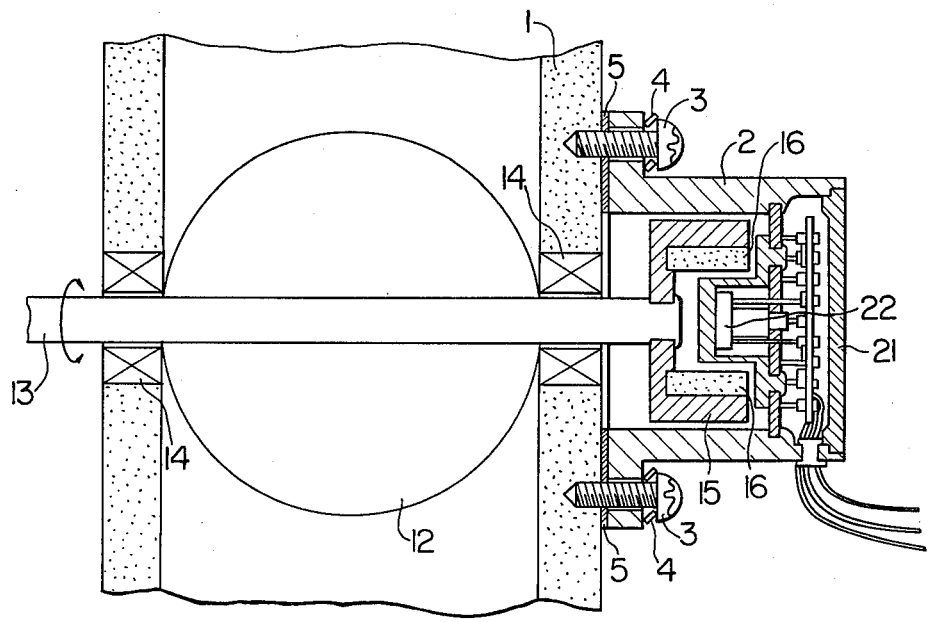
FIG. 1 is a sectional view showing the manner in which a sensor is mounted in an embodiment of the present invention.
Figure 2:
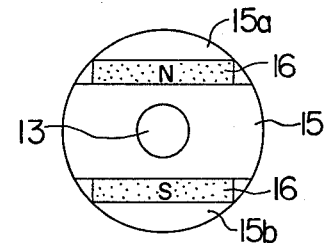
FIG. 2 is a plan view of the rotating member shown in FIG. 1.

FIG. 1 shows the mounting structure of a rotational angle detecting apparatus according to the present invention which is applied to a throttle position detecting apparatus. In the Figure, numeral 1 designates a throttle body, 12 a throttle valve, and 13 a throttle valve shaft adapted for rotation in response to the operation of the accelerator pedal of a vehicle which is not shown. The throttle valve 12 is attached to the throttle body 1 by means of bearings 14. Numeral 15 designates a yoke made from a magnetic material and fitted by caulking on one end of the throttle valve shaft 13, and 16 permanent magnets fixed to a pair of projections of the yoke 15 so that their north and south poles face each other. The yoke 15 and the permanent magnets 16 form a rotating member with a magnetic field generating source. This rotating member is so constructed that it rotates with the rotation of the shaft 13 in the same manner as the throttle valve 12. FIG. 2 is a plan view of the rotating member and it is adapted to produce a parallel magnetic field between the north and south poles 16 which are fixed to the pair of projections 15a and 15b of the yoke 15 as will be seen from the Figure.

Numeral 2 designates an enclosure made from a resin or metallic material and forming a throttle sensor proper, and 22 a plane pattern type magnetic sensing element whose resistance value varies in dependence on the direction of a magnetic field applied to it. Inside the enclosure 2, the magnetic sensing element 22 is arranged so that it is placed in the magnetic field produced by the permanent magnets 16 attached to the forward end of the shaft 13 and the pattern surface of the magnetic sensing element 22 extends substantially parallel to the direction of the field. Numeral 3 designates fastening screws for fastening the enclosure 2 to the throttle body 1, 4 spring washers, and 5 sealing material used to seal the contact surface between the throttle body 1 and the enclosure 2. As a result, the rotation of the throttle valve 12 results in the simultaneous rotation of the rotating member, thus changing the direction of the magnetic field applied to the magnetic sensing element 22 of the throttle sensor.

In this embodiment, the magnetic sensing element 22 specifically comprises a ferromagnetic metal type magneto-resistance element whose resistance value is varied anisotropically in dependence on the angle formed by the direction of a magnetic field and the direction of current flow and it may for example be of a three-terminal construction having Ni-Co ferromagnetic alloy deposited in a differential pattern. The resistance value of this element is varied in dependence on the intensity and direction of a magnetic field applied parallelly to the pattern surface of the element and the resistance value is not practically varied by the field component perpendicular to the pattern surface, thus proving its improved properties against noise field. When current is supplied to the element, it generates an output voltage corresponding to a change in the internal resistance value. Since this output (y) has a characteristic of $y = A\cos 2\theta + B$ with respect to the direction $\theta$ of a magnetic field, it is possible to ensure one-to-one correspondence between the output voltage of the magnetic sensing element and the direction of the magnetic field or the position of the throttle valve within the range of 0° to 90°. This magnetic sensing element 22 may for example be comprised of an SDMA (trade name) element.

Figure 3A:
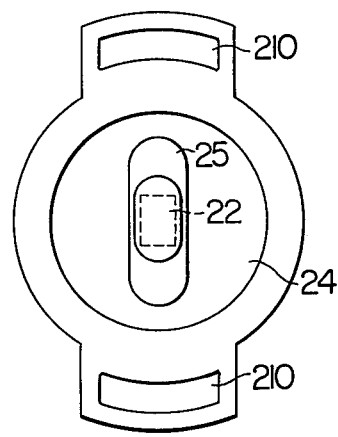
FIGS. 3A and 3B are respectively a plan view and a sectional view of the throttle sensor proper shown in FIG. 1.
Figure 3B:
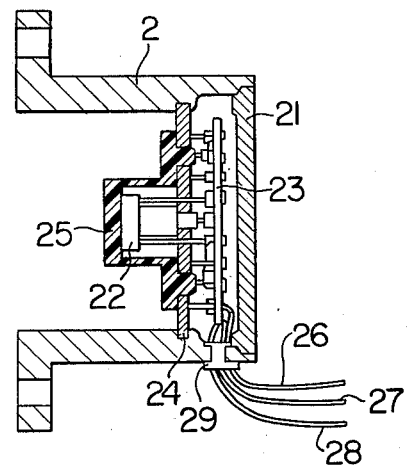

FIGS. 3A and 3B are respectively a plan view and a sectional view showing the construction of the throttle sensor proper. In the Figures, numeral 21 designates a cover made from a resin or metallic material, 22 the magnetic sensing element, 23 a hybrid IC unit including such functional elements as a power supply for the magnetic sensing element 22 and an amplifier for amplifying the output voltage of the element 22, and 24 a first mounting plate for attaching the magnetic sensing element 22 and the hybrid IC (Integrated Circuit) unit 23 to the housing of the enclosure 2. Numeral 25 designates a second depressed mounting plate made from a synthetic resin material and adapted to arrange the magnetic sensing element 22 in a proper positional relation. The end portions of the mounting plate 25 are fitted in the mounting holes of the first mounting plate 24, and the magnetic sensing element 22 is secured to the depressed portion. Numerals 26, 27 and 28 designate respectively power supply, grounding and signal output harnesses. Numeral 29 designates a grommet for taking out the harnesses to the outside. In this embodiment, the first and second mounting plates 24 and 25 for fastening the magnetic sensing element 22 correspond to a non-rotating member.

A principal feature of the present invention resides in the fact that the no moving parts such as the shaft and the bearings are included in the throttle sensor proper of the apparatus as shown in FIG. 3, thus further simplifying the construction and adjustment of the sensor proper, improving its durability against vibrations, etc., and simplifying the maintenance of the apparatus for a long period of service. The reason is that since the sensor of this invention is of the non-contacting type and particularly the sensor element or the magnetic sensing element 22 comprises a ferromagnetic metal magneto-resistance element, it is only necessary to arrange the element so as to be responsive to the magnetic field produced by the permanent magnets 16, and if, in this case, the intensity of the magnetic field by the permanent magnets 16 is preset to a sufficiently large value so as to saturate the output component with respect to the intensity of the magnetic field, it is possible to prevent any variation of the sensor output due to any slight variation of the field intensity caused by the aging of the permanent magnets 16 or the effect of temperatures. Another reason is that since the magnetic sensing element 22 is largely influenced only in the direction of the magnetic field, the spacing between the magnetic sensing element 22 and the permanent magnets 16 can be made comparatively rough and thus there is no need to particularly strictly adjust the spacing when mounting the sensor proper to the throttle body 1 or the object to be detected.

In the case of this embodiment, what is important in mounting the throttle sensor proper to the throttle body 1 is only to adjust the mounting angle of the throttle sensor proper such that the initial output condition of the throttle sensor corresponds to the fully closed angle of the throttle valve, and no difficulty will be caused from the sensor output characteristic point of view even if the spacing between the permanent magnets 16 and the magnetic sensing element 22 and the magnetic force of the permanent magnets 16 are varied somewhat. The adjustment of the mounting angle of the throttle sensor proper is effected at the time of tightening the screws 3 while observing the sensing output voltage, and for this purpose the throttle sensor proper includes mounting holes 210 which are elongated as shown in FIG. 3A.

Further, while, in this embodiment, the permanent magnets 16 are arranged on the throttle body side, conversely the magnetic sensing element 22 may be arranged on the throttle body side. In this case, however, the arrangement of the input and output terminals of the magnetic sensing element and the harnesses will become inevitably complicated as compared with the case of the illustrated embodiment.

We claim:
1. A rotational angle detecting apparatus comprising:
a throttle valve rotatably mounted in a throttle body;
a yoke made of a magnetical material and fixed to a shaft of said throttle valve;
a pair of permanent magnets so fixed to said yoke with a space, to generate a parallel magnetic field in said space; and
magnetic sensing means adjustably mounted in a support in said space to generate an electrical output in response to an angular displacement of said permanent magnets with respect to said magnetic sensing means, said magnetic sensing means including a ferromagnetic metal magneto-resistance element whose electric resistance varies in dependence on changes of an angle formed by a direction of the magnetic field and a direction of a current flowing therethrough.

2. A rotational angle detecting apparatus comprising:
a rotating element rotatably supported in a tubular supporting means;
a yoke made of a magnetic material and fixed to a shaft of said rotating element, said yoke having a pair of projections forming a space therebetween;
a pair of permanent magnets respectively fixed to said pair of projections for generating a parallel magnetic field in said space; and
magnetic sensing means adjustably mounted in a support in said space and between said pair of permanent magnets for generating an electrical output in response to an angular displacement of said rotating element with respect to said magnetic sensing means, said magnetic sensing means including a ferromagnetic metal magneto-resistance element whose electrical resistance varies in dependence on changes of an angle formed by a direction of the magnetic field and a direction of a current flowing therethrough.

* * * * *